3 Sheets—Sheet I.
C. F. BAILEY & G. F. PERRENOT.
IRONING APPARATUS.
No. 183,621.          Patented Oct. 24, 1876.
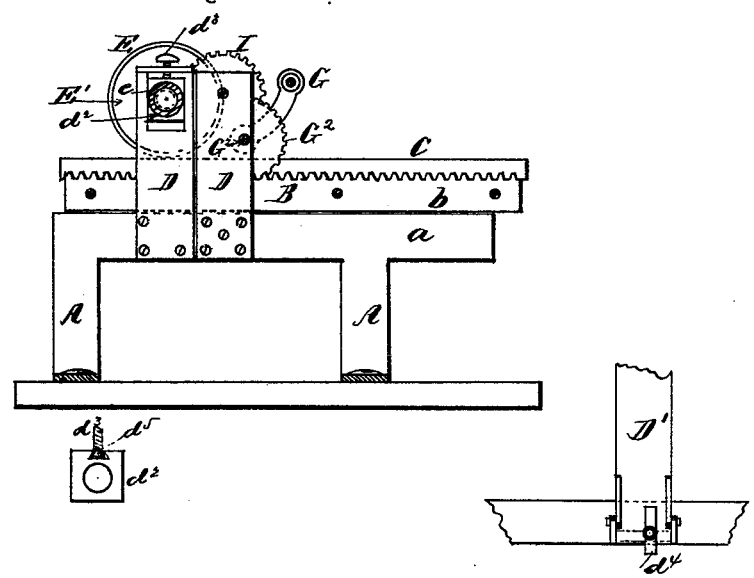
Fig. 1.
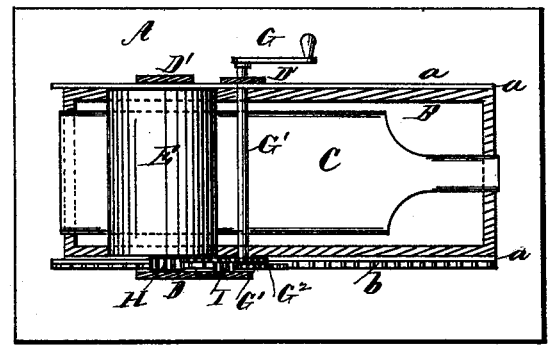
Fig. II.
Witnesses:
Richard Gerner
Franklin Barrett
Inventors:
Charles F. Bailey
George F. Perrenot
Per. Henry Gerner
Att'y.

3 Sheets—Sheet 2.
C. F. BAILEY & G. F. PERRENOT.
IRONING APPARATUS.
No. 183,621. Patented Oct. 24, 1876.
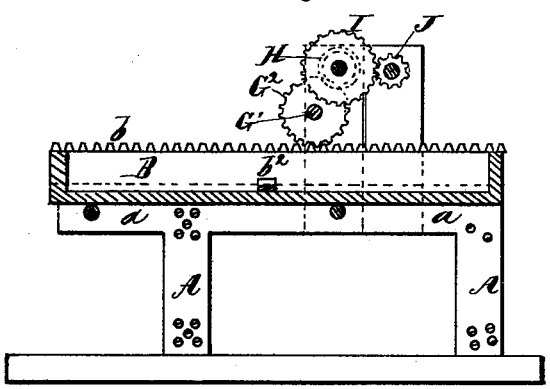
Fig. III.
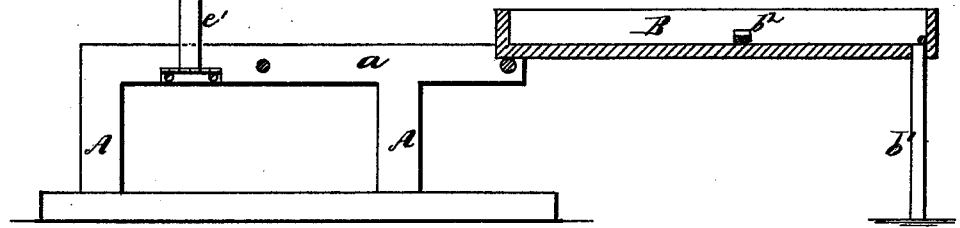
Fig. IV.
Witnesses:
Richard Gerner
Franklin Barrett
Inventors:
Charles F. Bailey
George F. Perrenot
Per: Henry Gerner, Atty 3 Sheets—Sheet 3.
C. F. BAILEY & G. F. PERRENOT.
IRONING APPARATUS.
No. 183,621. Patented Oct. 24, 1876.
Fig. V.
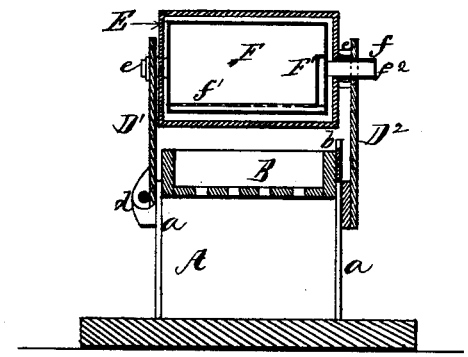
Fig. VI
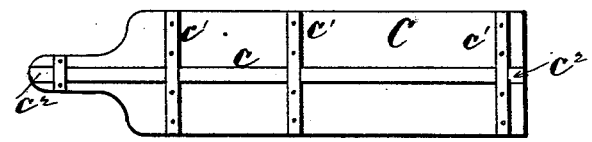
Witnesses:
Richard Gerner.
Franklin Barrick
Inventors:
Charles F. Bailey
George F. Perrenot.
Per Henry Gerner,
Att'y.
N. PETERS, PHOTO-LITHOGRAPHER, WASHINGTON, D. C.

UNITED STATES PATENT OFFICE

CHARLES F. BAILEY AND GEORGE F. PERRENOT, OF ROCKPORT, TEXAS.

IMPROVEMENT IN IRONING APPARATUS.

Specification forming part of Letters Patent No. 183,621, dated October 24, 1876; application filed April 17, 1876.

*To all whom it may concern:*

Be it known that we, CHARLES F. BAILEY and GEORGE F. PERRENOT, of the city of Rockport, in the county of Aransas and State of Texas, have invented a new and useful Improvement in a Machine for Ironing Clothing, of which the following is the specification:

The object of this invention is to produce a machine for ironing clothing by means of a revolving heated roller, under which is passed a reciprocating table, on which the clothing is placed.

The nature of the invention will be readily understood by the subjoined description, and by the accompanying drawings, of which—

Figure I is a side elevation of the improved machine. Fig. II is a general plan of the same. Fig. III is a sectional side elevation, showing the gearing by which the cylinder and the reciprocating table are driven. Fig. IV is a longitudinal sectional elevation of the machine with the reciprocating table drawn out and supported on its adjustable leg, and the rotary cylinder resting on its adjustable support. Fig. V is a transverse sectional elevation of the machine, taken through the center of the cylinder. Fig. VI is a bottom plan of the ironing-board.

The frame A, which is preferably made of cast-iron, supports the other parts of the machine. The side beams $a$ of this frame furnish guides and supports for a reciprocating frame, B, to one side of which is attached a cogged rack, $b$, by which it is moved back and forth on its ways $a$ by means of a cogged wheel, which gears into the said cogged rack. The ironing-board C is built with a padded top, and on its bottom side one longitudinal strengthening-rib, $c$, and two or more transverse ribs, $c^1$, as shown in Fig. VI, for the purpose of strengthening it. This ironing-board is reduced in width near one of its ends, as shown in Figs. II and VI, so as to accommodate certain kinds of clothing, and at each of its ends is a trunnion, $c^2$, by means of which it rests in concave bearings in the ends of the reciprocating frame B, in such a manner as to yield laterally as required, to accommodate uneven thicknesses of clothing under the ironing-roller. The frame B has an open or slotted bottom, so that it forms a tray for the support of parts of the garments that are being ironed. A movable leg, $b^1$, is hinged to one end of the frame B, so as to support it when moved out into the position shown in Fig. IV. When not in use this leg will be held up to the bottom by means of a button, $b^2$, that will turn over two of the slats of the bottom of B, between which it will fold up when not in use. The standard D is fixed to one side of the frame A, and on the opposite side of the said frame the standard D' is attached thereto by means of the hinges $d$. The upper ends of these standards carry small pillar-blocks $d^2$, that furnish bearings for the journals $e$ of the hollow ironing-cylinder E. The pillar-blocks $d^2$ have adjusting-screws $d^3$, by means of which the bearings of the ironing-cylinder may be adjusted so as to produce the desired pressure upon the ironing-board. Near the lower ends of the adjusting-screws there are grooves turned in their peripheries, so as to form the lower ends $d^5$ of the said screws in the shape of an inverted T, and corresponding recesses are provided in the top ends of the pillar-blocks $d^2$ for the reception of these screw ends. The effect of this peculiar construction is to connect the screws with the pillar-blocks in such a manner as to permit the screws to move the pillar-blocks up or down, as desired, so as to adjust the bottom side of the roller E to the ironing-board as required. The button $d^4$, shown in Fig. I, is attached to the frame A, and when turned up in a vertical position will overlap the side of the standard D', and hold it up in a vertical position, so as to support the journal of the cylinder E, but when the said button $d^4$ is turned over in a horizontal position the standard D' may be turned down, so as to release the journal of the cylinder E and permit the said cylinder to be removed from the frame, or, what will most usually occur, the loose head E' of the cylinder E will be removed, and while this is being done the end of the cylinder left free by the removal of the standard D', will be supported by the hinged arm $e'$ that is attached to the inside of the frame A, as is shown in Fig. IV. The cylinder E has within it another hollow cylinder, F, that is used for heating purposes. The construction of these cylinders will be readily understood from Figs. IV, V.

The interior cylinder F has hollow journals $f$, that are supported in the hollow journal, $e$. One of the journals $f$ will extend beyond its journal $e$, and there have a pin through it, and through some stationary part of the machine, or in such suitable manner be fixed so that it cannot revolve, while the cylinder E is permitted to revolve around it. The interior or heating cylinder F will thus be made stationary, and near its bottom will be a perforated or slotted fire-bottom, $f^1$, on top of which some suitable fuel will be placed for heating the cylinders E F. A tube, $f^2$, leads from below the plate $f^1$ at one end of the cylinder up to the hollow journal on that end, and on the outside of the journal on that end there will be attached a smoke-flue, F', for carrying off the products of combustion. The opposite hollow journal $f$ will supply atmospheric air to support the combustion.

One side of the cylinder F will have a hinged door, $f^3$, through which fuel may be introduced into the cylinder. The loose head E' of the cylinder E, and the hinged support D', permit the cylinder F to be drawn out of E for the purpose of introducing fuel into cylinder F.

The cylinder E may be heated as above described, or it may be heated by the introduction into it of hot air or steam, or by any other suitable means. A crank, G, on the shaft $G^1$, which is supported on some suitable part of the frame A, is used to set in motion the operative parts of the machine. The cogged wheel $G^2$, also on the shaft $G^1$, gears into the cogged rack $b$, and moves the frame B with its ironing-board C as required. This wheel $G^2$ also actuates, through the medium of the gearing H I J, the roller E. By means of this gearing the periphery of the collar E will be given a higher speed than the face of the ironing-board C, and the effect of this increased speed will be to polish the clothing that is passed under the said roller E.

In operation, the clothing is placed upon the board C, and the machine then set in motion by turning the crank G.

The outside of roller E should be plated with nickel or other suitable material, or it may be built entirely of some non-tarnishing metal.

Having thus described our invention, we desire to claim—

1. The ironing-board C, having one of its ends reduced in width and strengthened with the bottom bracing-ribs $c$ and $c^1$, and its ends provided with trunnions $c^2$, by means of which it is mounted on its bearings on frame B, so as to be allowed a transverse oscillating motion, as described and set forth.

2. The heating-cylinder F with hollow journals $f$, that rest in the hollow journals of its outer cylinder E, and fitted in a stationary position by means of one of the journals $f$, and also provided with fire-bottom $f^1$ and smoke-flues $f^2$ and F', substantially as and for the purpose set forth.

3. The reciprocating frame B, having an open bottom that adapts it to the support of the clothing being ironed, and provided with the supporting-leg $b^1$ and the cogged rack $b$, by which it is operated.

4. The hinged standard D', with its retaining-button $d^4$, for the support of the hollow journal of the removable head E', substantially as and for the purpose set forth.

5. The hinged arm $e'$, for the support of the free end of cylinder E when the standard D' is removed, as and for the purpose set forth.

6. The pillar-blocks $d^2$, and their adjusting-screws $d^3$, in combination with the standards D and D', and the hollow journals $e$, as and for the purpose set forth.

C. F. BAILEY.
G. F. PERRENOT.

Witnesses:
L. B. RUSSELL,
F. D. PERRENOT.